United States Patent
Hall, Jr. et al.

(10) Patent No.: US 7,660,897 B2
(45) Date of Patent: Feb. 9, 2010

(54) METHOD, SYSTEM, AND PROGRAM FOR DISTRIBUTING APPLICATION TRANSACTIONS AMONG WORK SERVERS

(75) Inventors: Harold Hershey Hall, Jr., San Jose, CA (US); Lawrence Shun-mok Hsiung, Los Altos, CA (US); Luis Javier Ostdiek, San Jose, CA (US); Noshir Cavas Wadia, Morgan Hill, CA (US); Peng Ye, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 859 days.

(21) Appl. No.: 10/911,058

(22) Filed: Aug. 3, 2004

(65) Prior Publication Data

US 2006/0031242 A1 Feb. 9, 2006

(51) Int. Cl.
  *G06F 15/173* (2006.01)
  *G06F 15/167* (2006.01)
  *G06F 15/16* (2006.01)
  *G06F 7/00* (2006.01)

(52) U.S. Cl. .................. 709/226; 709/215; 709/219; 709/235; 707/101

(58) Field of Classification Search .................. 709/226
  See application file for complete search history.

(56) References Cited

U.S. PATENT DOCUMENTS

| | | | |
|---|---|---|---|
| 5,872,930 A | 2/1999 | Masters et al. | |
| 5,881,238 A * | 3/1999 | Aman et al. | 709/226 |
| 6,038,664 A | 3/2000 | Schumacher et al. | |
| 6,115,745 A | 9/2000 | Berstis et al. | |
| 6,438,652 B1 | 8/2002 | Jordan et al. | |
| 6,502,062 B1 | 12/2002 | Acharya et al. | |
| 6,560,717 B1 | 5/2003 | Scott et al. | |
| 6,601,084 B1 * | 7/2003 | Bhaskaran et al. | 718/105 |
| 6,697,849 B1 | 2/2004 | Carlson | |

(Continued)

FOREIGN PATENT DOCUMENTS

EP 1 041 496 A2 10/2000

(Continued)

OTHER PUBLICATIONS

IBM, Corp. WebSphere™ Edge Server for Multiplatforms. Network Dispatcher Administration. Version 2.0, No. GC31-8496-06, 2001. Title Page; Table of Contents (iii-viii); Chapters 1-5 (pp. 1-70); Chapter 14 (pp. 119-184) [online].

(Continued)

*Primary Examiner*—Ario Etienne
*Assistant Examiner*—Blake Rubin
(74) *Attorney, Agent, or Firm*—Rabindranath Dutta; Konrad Raynes & Victor LLP

(57) ABSTRACT

Provided are a method, system, and program for distributing application transactions among work servers. Application transaction rates are determined for a plurality of applications supplying transactions to process. For each application, available partitions in at least one server are assigned to process the application transactions based on partition transaction rates of partitions in the servers. For each application, a determination is made of weights for each server including partitions assigned to the application based on a number of partitions in the server assigned to the application. The determined weights for each application are used to distribute application transactions among the servers including partitions assigned to the application.

33 Claims, 7 Drawing Sheets

U.S. PATENT DOCUMENTS

| | | | |
|---|---|---|---|
| 6,728,748 B1 | 4/2004 | Mangipudi et al. | |
| 2001/0049741 A1* | 12/2001 | Skene et al. | 709/232 |
| 2002/0049841 A1* | 4/2002 | Johnson et al. | 709/225 |
| 2002/0107903 A1* | 8/2002 | Richter et al. | 709/201 |
| 2003/0105903 A1 | 6/2003 | Garnett et al. | |
| 2003/0195919 A1* | 10/2003 | Watanuki et al. | 709/105 |
| 2004/0103194 A1 | 5/2004 | Islam et al. | |
| 2004/0162901 A1* | 8/2004 | Mangipudi et al. | 709/225 |
| 2005/0152354 A1* | 7/2005 | Abel et al. | 370/389 |
| 2005/0185584 A1* | 8/2005 | Nagesh et al. | 370/235 |

FOREIGN PATENT DOCUMENTS

| | | |
|---|---|---|
| EP | 1 128 613 A2 | 8/2001 |

OTHER PUBLICATIONS

IBM Corp. *Multiple Machines*, pp. 1-53 [online] [donwloaded on Jul. 9, 2004] Available from http://www-306.ibm.com/software/webservers/appserv/doc/v40/ae/infocenter/was/pdf/nav_Multiguide.pdf.

IBM Corp. Gage, C., Senior Software Engineer. *White Paper*. WebSphere™ Edge Server Version 1.0.3. Load Balancer (IBM Network Dispatcher Version 3.6). Scalability, Availability and Load-balancing for TCP/IP Applications, Feb. 2001, pp. 1-23 [online] [retrieved Mar. 20, 2001].

U.S. Appl. No. 10/762,916, entitled *System and Method for Supporting Transaction and Parallel Services in a Clustered System Based on a Service Level Agreement*, filed Jan. 22, 2004 by D.M. Dias, et al.

\* cited by examiner

Server Transaction Capability Entry

Weight Assignment

Server Partition Assignment

Application Threshold Info

METHOD, SYSTEM, AND PROGRAM FOR DISTRIBUTING APPLICATION TRANSACTIONS AMONG WORK SERVERS

BACKGROUND OF THE INVENTION

1. Field of the Invention

The present invention relates to a method, system, and program for distributing application transactions among work servers.

2. Description of the Related Art

A workload manager program attempts to optimize the distribution of application transactions among different systems, such as servers, that are assigned to process the transactions for the applications. Workload management programs balance client workloads, distribute processing tasks to the capacities of the different machines in the system, provide failover capability by redirecting client requests if one or more servers are unable to process client transactions, improve the availability of applications and administrative services, and enable systems to be scaled-up to serve a higher client load than provided by the basic configuration.

Server computational resources may be allocated to applications through vertical or horizontal scaling. Vertical scaling is performed by creating multiple clones of an application server on a single machine. Processing resources are then assigned to clones or services within a single machine first before going to other machines. Vertical scaling can also be implemented on multiple machines in a group of servers dedicated to processing application transactions. In horizontal scaling, clones of an application server are created on multiple physical machines. Processing resources are then assigned to clones or services on different machines. This enables a single application to span several machines yet still present a single system image. The application transactions may then be distributed to application servers on different machines.

One example of a workload manager performing load balancing among different servers is the International Business Machines® ("IBM") Network Dispatcher that is used to distribute requests among application server instances that are running on multiple physical machines. Network Dispatcher is part of the IBM WebSphere® Edge Server product, described in the IBM publication "WebSphere Edge Server for Multiplatforms: Network Dispatcher Administration Guide, Version 2.0", having document no. GC31-8496-06 (Copyright IBM, 2001), which publication is incorporated herein by reference in its entirety. (IBM and WebSphere are registered trademarks of IBM).

SUMMARY

Provided are a method, system, and program for distributing application transactions among work servers. Application transaction rates are determined for a plurality of applications supplying transactions to process. For each application, available partitions in at least one server are assigned to process the application transactions based on partition transaction rates of partitions in the servers. For each application, a determination is made of weights for each server including partitions assigned to the application based on a number of partitions in the server assigned to the application. The determined weights for each application are used to distribute application transactions among the servers including partitions assigned to the application.

DETAILED DESCRIPTION

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
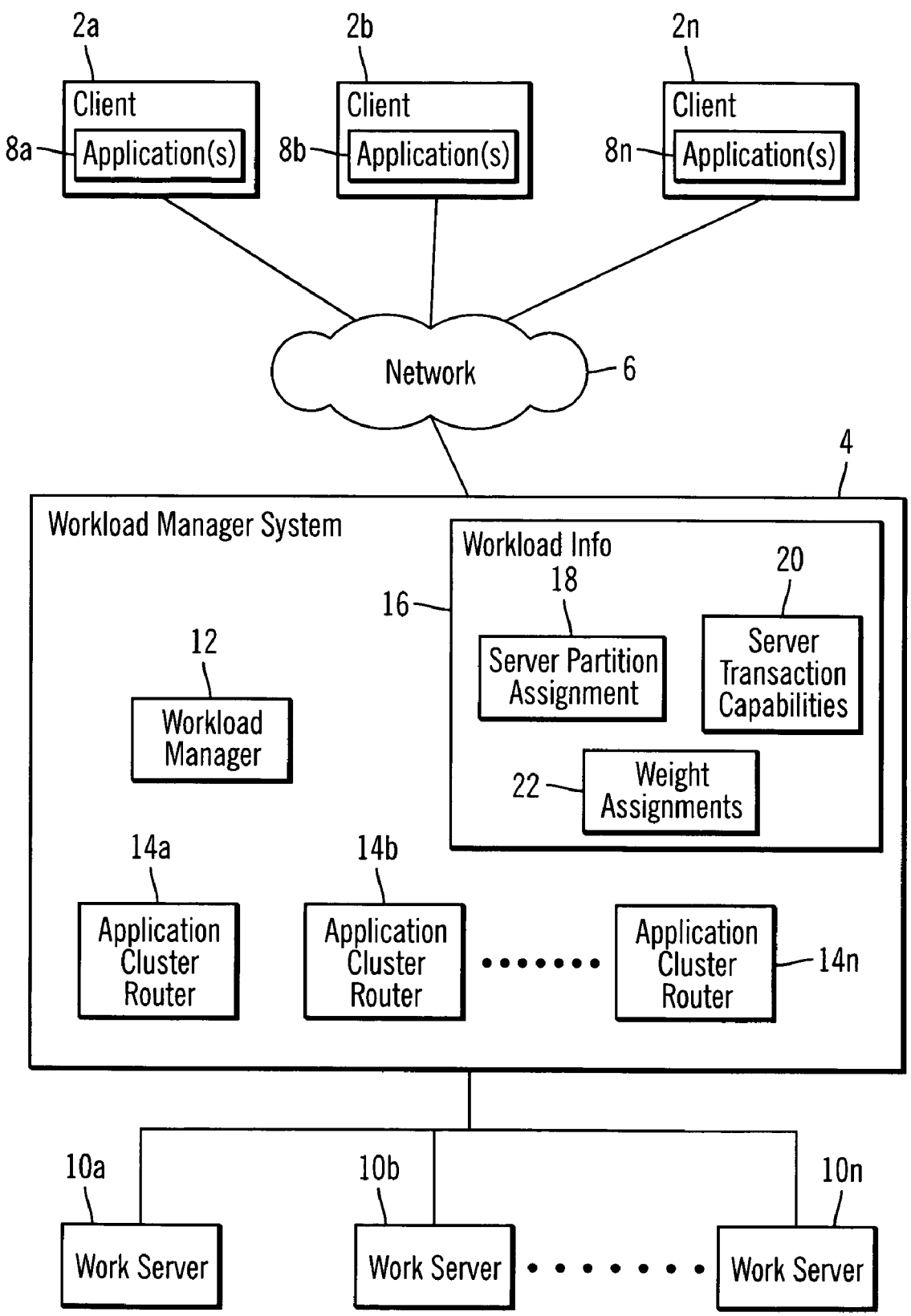
FIG. 1 illustrates a distributed computing environment.

FIG. 1 illustrates a distributed computing environment where a plurality of clients $2a$, $2b$ . . . $2n$ communicate application transactions to a workload server 4 over a network 6. The clients $2a$, $2b$ . . . $2n$ execute one or more applications $8a$, $8b$ . . . $8n$ that forward transactions to process to the workload server 4. The workload server 4 transmits transactions from the applications to work servers $10a$, $10b$ . . . $10n$ to process the transactions. The clients $2a$, $2b$ . . . $2n$ and workload server 4 may comprise computing devices known in the art suitable for performing their defined operations, such as a server, workstation, desktop computer, laptop computer, etc. The network 6 may comprise networks known in the art, such as a Wide Area Network (WAN), Local Area Network (LAN), Storage Area Network (SAN), wireless network, the Internet, and Intranet, etc. The work servers $10a$, $10b$ . . . $10n$ comprise any computing device suitable for concurrently executing multiple transactions. The applications $8a$, $8b$ . . . $8n$ comprise application programs known in the art, such as database applications, financial applications (e.g., online trading, accounting, account management, etc.), searching tools, network transmission applications, etc.

The workload manager system 4 includes a workload manager 12 that determines a weight assignment used by the application cluster routers $14a$, $14b$ . . . $14n$ to determine how many application transactions for applications to forward to one or more of the work servers $10a$, $10b$ . . . $10n$. The application cluster routers $14a$, $14b$ . . . $14n$ receive transactions for one or more applications $8a$, $8b$ . . . $8n$ and route the transaction to one or more of the work servers $10a$, $10b$ . . . $10n$ according to weights based on the work server partitions assigned to a particular application. Each work server $10a$, $10b$ . . . $10n$ may be divided into a number of partitions, where each partition represents a portion of the computational resources of the work server $10a$, $10b$ . . . $10n$. A partition comprises a logical or physical division of the work server $10a$, $10b$ . . . $10n$ processing resources that may be dynamically assigned or dedicated to processing application transactions. The work servers $10a$, $10b$ . . . $10n$ may have different computational resource capabilities and be heterogeneous. Moreover, once a partition is assigned to an application, the application program may be cloned for that partition to execute application transactions in the assigned partition.

The workload manager 12 maintains workload information 16 used in managing the workflow, including a server partition assignment 18, server transaction capabilities 20, and weight assignments 22.

Figure 2:
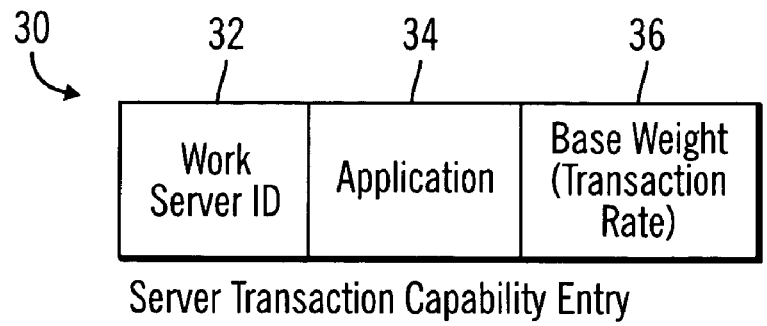
FIGS. 2, 3, 4, and 5 illustrates information used to distribute application transactions among work servers.

FIG. 2 illustrates information maintained in an entry 30 in the server transaction capabilities 20 information as including: a work server identifier (ID) 32 identifying one work server 10a, 10b ... 10n; an application 34; and a base weight 36 indicating the transaction rate at which the identified work server 10a, 10b ... 10n processes the identified application's transactions if all of the work server's 10a, 10b ... 10n assignable capabilities or partitions are processing the application's transactions. The transaction rate may comprise transactions per second or some other measurement of a rate at which computational resources process transactions. The server transaction capability information 18 can be used to determine the transaction rate at which a work server partition processes a particular application, which is the base weight divided by the number of partitions in the work server 10a, 10b ... 10n that may be used for processing application transactions.

Figure 3:
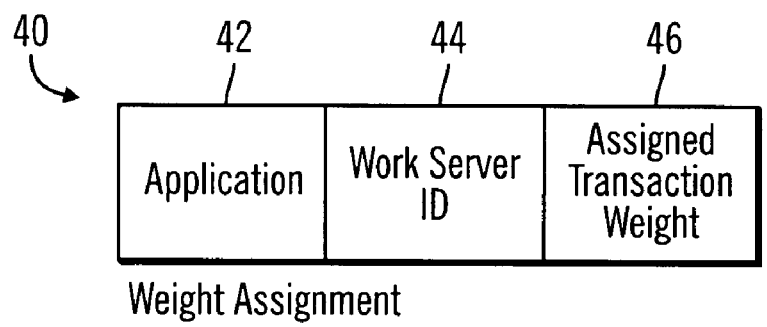

FIG. 3 illustrates an entry 40 in the weight assignments 22 information, which indicates an application 42 being executed by a work server 10a, 10b ... 10n identified in field 44. The assigned transaction weight 46 indicates some portion of the identified work server 10a, 10b ... 10n dedicated to processing the identified application. For instance, the weight 46 may comprise the number of partitions in the identified work server 44 assigned to process the identified application transactions. There may be multiple weight assignment entries for multiple servers assigned to process transactions for one application if the application's transactions are distributed to multiple work servers 10a, 10b ... 10n.

Figure 4:
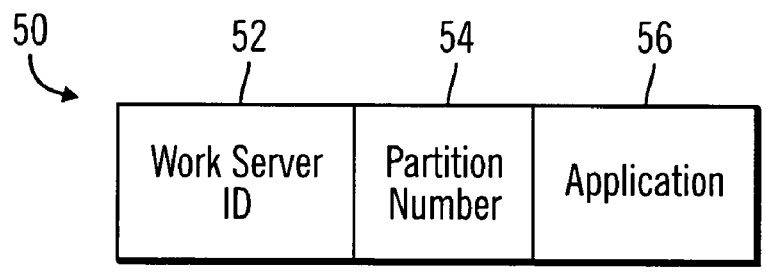

FIG. 4 illustrates an entry 50 in the server partition assignment 18 information that includes a work server identifier (ID) 52 and a partition number 54 in the work server 52 assigned to process the indicated application 56. There may be multiple server partition assignment entries 50 for one application 56 indicating the work servers 52 and partitions 54 assigned to process transactions for the application 56.

Figure 5:
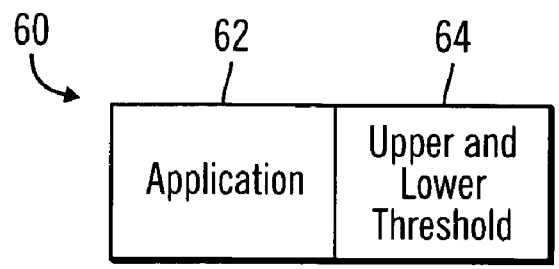

FIG. 5 illustrates application threshold information 60, which includes for an indicated application 62 an upper and lower threshold 64 indicating a transaction level for the application at which one or more partitions should be added or removed, respectively.

Figure 6:
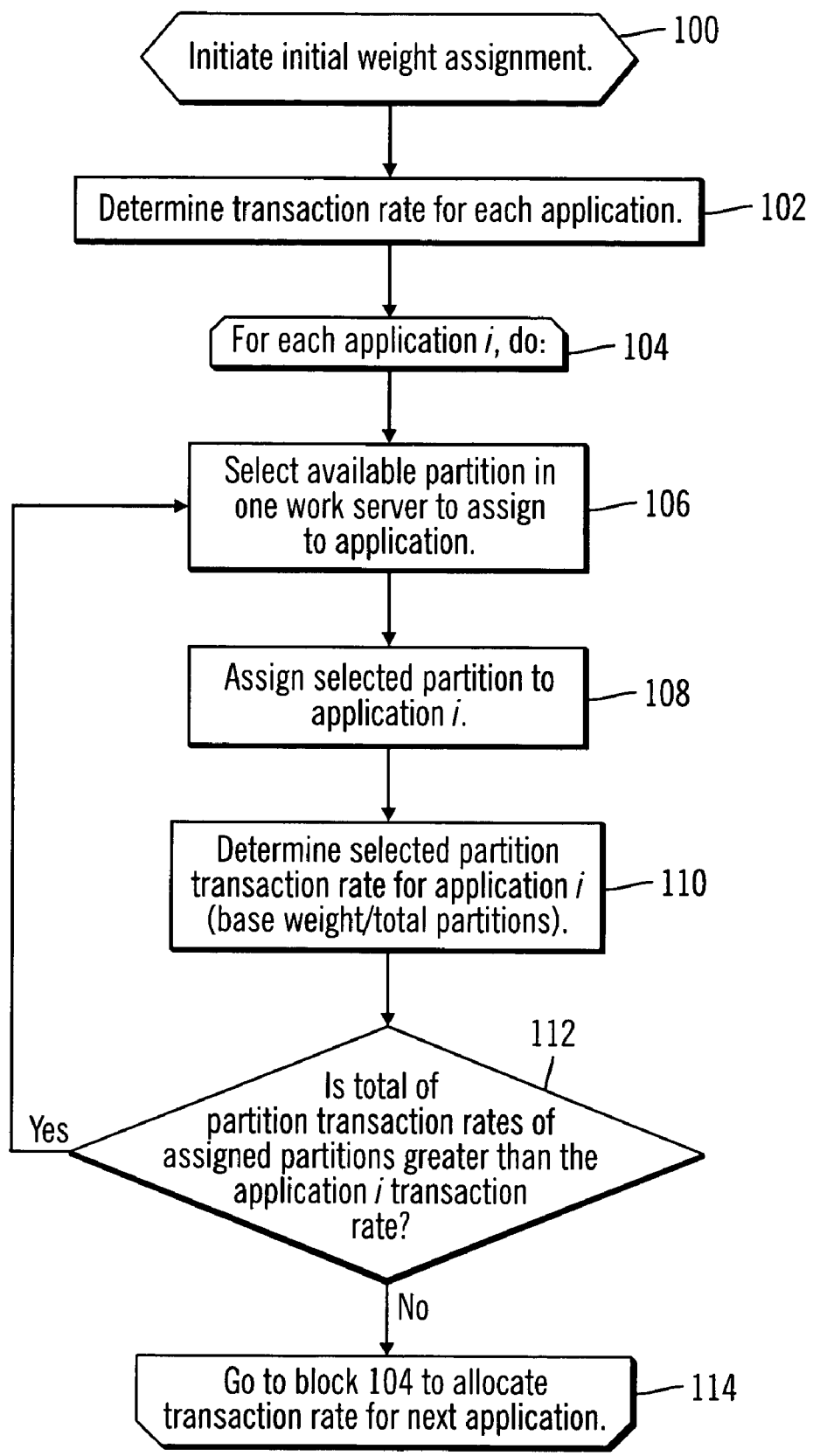
FIGS. 6, 7, 8, 9, and 10 illustrate operations to distribute application transactions among work servers.

FIG. 6 illustrates operations performed by the workload manager 12 to determine the initial weight assignments of work server 10a, 10b ... 10n processing resources, e.g., partitions, assigned to process transactions for the applications. Upon initiating the weight assignment determination (at block 100), the workload manager 12 determines (at block 102) the transaction rate for each application, e.g., applications 8a, 8b ... 8n. For each application i, a loop is performed at blocks 104 through 114. The workload manager 12 selects (at block 106) an available partition in one work server 10a, 10b ... 10n and assigns (at block 108) the selected partition to application i. When assigning the selected partition to the application, the workload manager 12 may add a server partition assignment entry 50 to the server partition assignment table 18, identifying the partition 54 assigned to the application 56.

The workload manager 12 determines (at block 110) the selected partition transaction rate for application i, which may comprise the base weight 36 (FIG. 2) for the work server 32 and application i divided by the total number of partitions in the work server 10a, 10b ... 10n including the selected partition. If (at block 112) the total of the partition transaction rates of assigned partitions is less than the application i transaction rate, then control proceeds back to block 106 to assign an additional partition to the application i. Otherwise, if the total assigned partition transaction rate is greater than or equal to the application i transaction rate, then control proceeds (at block 114) back to block 104 to assign partitions to the next application having transactions to process. In this way, the workload manager 12 attempts to assign enough partitions to an application so that the sum of the assigned partition transaction rates is greater or equal to the application transaction rate.

The result of FIG. 6 is an assignment of work server partitions to process the application transactions at a transaction processing rate equivalent to the application transaction rate. If there are no available partitions in any of the work servers 10a, 10b ... 10n to allocate to one application, then the workload manager 12 may reassign one or more partitions from other applications to an application having no assigned partitions. For instance, if some applications have no assigned partitions or fewer than other applications, then the workload manager 12 may execute a load balancing algorithm to rebalance the assignment of partitions to optimize transaction processing. Moreover, applications may be ranked by priority, so that applications having higher priority will be assigned partitions to cover a greater amount of their application transaction rate than applications having lower priority.

In certain embodiments, the workload manager 12 transmits the weight for each application 8a, 8b ... 8n to the application cluster router 14a, 14b ... 14n that is assigned to process the transactions for that weight. The application cluster router 14a, 14b. 14n uses the weights to allocate application transactions among the work servers 10a, 10b ... 10n assigned to process the transactions for the application.

Figure 7:
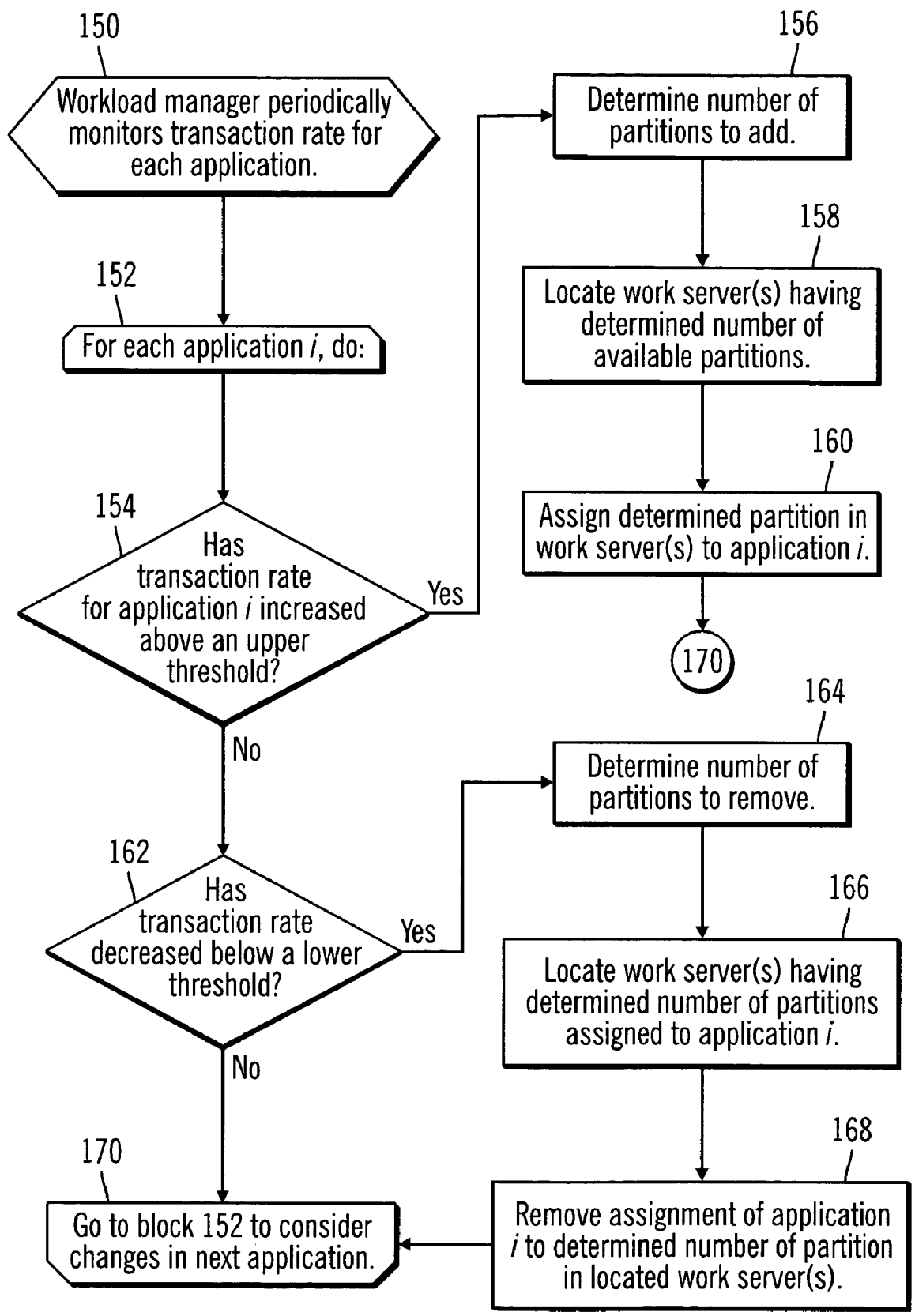

FIG. 7 illustrates operations performed by the workload manager 12 to monitor the transaction rate at the applications 8a, 8b ... 8n and determine whether the assignment of partitions for that application needs to be dynamically adjusted. The workload manager 12 periodically monitors (at block 150) the transaction rate, e.g., transactions per second, for each application 8a, 8b ... 8n, indicating the rate at which the application submits transactions to process. A loop is then performed at blocks 152 through 170 for each application i assigned partitions to process the transactions for that application i. If (at block 154) the transaction rate for application i increased above an upper threshold, e.g., upper threshold 64 indicated in the application threshold information 60 for application i, then the workload manager 12 determines (at block 156) a number of partitions to add and locates (at block 158) one or more work server(s) 10a, 10b ... 10n having the determined number of available partitions. The determined partitions in the work server(s) are then assigned (at block 160) to application i. When assigning a partition to an application, an entry 50 is added to the server partition assignment 18 information for each added partition identifying the work server 52 having the assigned partition, the partition number 54, and the application 56 to which the partition is assigned.

If (at block 162) the transaction rate for application i did not increase above an upper threshold (at block 154), but decreased below a lower threshold, e.g., the lower threshold 64 for application i in the application threshold information 60, then the workload manager 12 determines (at block 164) a number of partitions to remove from the assignment to application i and locates (at block 166) one or more work servers having the determined number of partitions assigned to application i. The server partition assignment information 18 may be processed to determine partitions assigned to work servers 10a, 10b ... 10n that may be removed from the assignment. The determined number of partitions in the located work servers are removed (at block 168) from the assignment to application i. An assignment may be removed by deleting the server partition assignment entry 50 for the determined partition to remove the assignment of the partition to application i. After adding (at block 160) or removing (at block 168) assignments of partitions with respect to application i, control proceeds to block 170 to determine whether partition assignments need to be readjusted for the next application.

With the logic of FIG. 7, the workload manager 12 may adjust the number of partitions assigned to an application based on the current transaction rate for the application. Further, the workload manager 12 may perform load balancing operations to balance the work server 10a, 10b . . . 10n workload when deciding which work servers to select to add or remove a partition for the application.

Moreover, the workload manager 12 may balance the assignments of partitions to applications to both balance the workloads assigned to the work servers 10a, 10b . . . 10n and optimize the assignment of partitions to applications. For instance, if there are not enough partitions available to cover the entire transaction rate for one application, then the workload manager 12 may ensure that at least a minimal number of partitions are assigned to an application to ensure that the application's transactions are processed at a minimal rate, even though they may be processed at a rate lower than the application transaction rate. Moreover, the workload manager 12 may have to reassign partitions from certain applications to other applications to ensure a sufficient minimum number of partitions are assigned to applications. Still, applications may be ordered according to priority, so that if there are not enough available partitions to satisfy the transaction rate for all applications, those partitions having a higher priority will receive priority when determining the number of partitions to assign to the applications. This ensures that applications having a higher priority will have a greater percentage of their application transaction rate met by the assigned partitions than applications having a lower priority.

Figure 8:
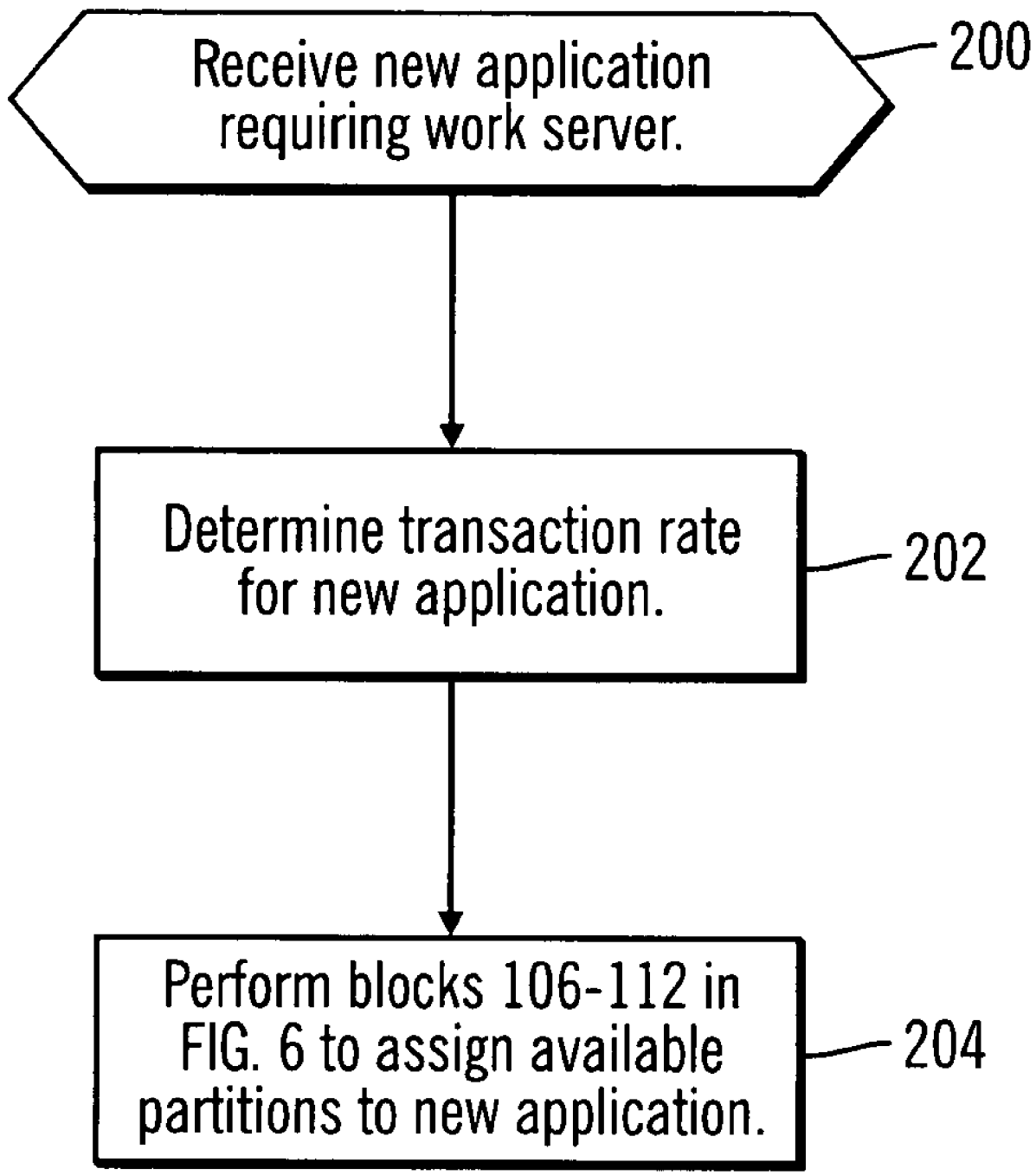

FIG. 8 illustrates operations performed by the workload manager 12 when receiving indication of a new application that will be generating transactions processed by the work servers 10a, 10b . . . 10n. Upon receiving (at block 200) information on the new application, the workload manager 12 determines (at block 202) the transaction rate for the new application and then performs (at block 204) the operations at blocks 106-112 in FIG. 6 to assign partitions to the new application to process the new application transactions.

Figure 9:
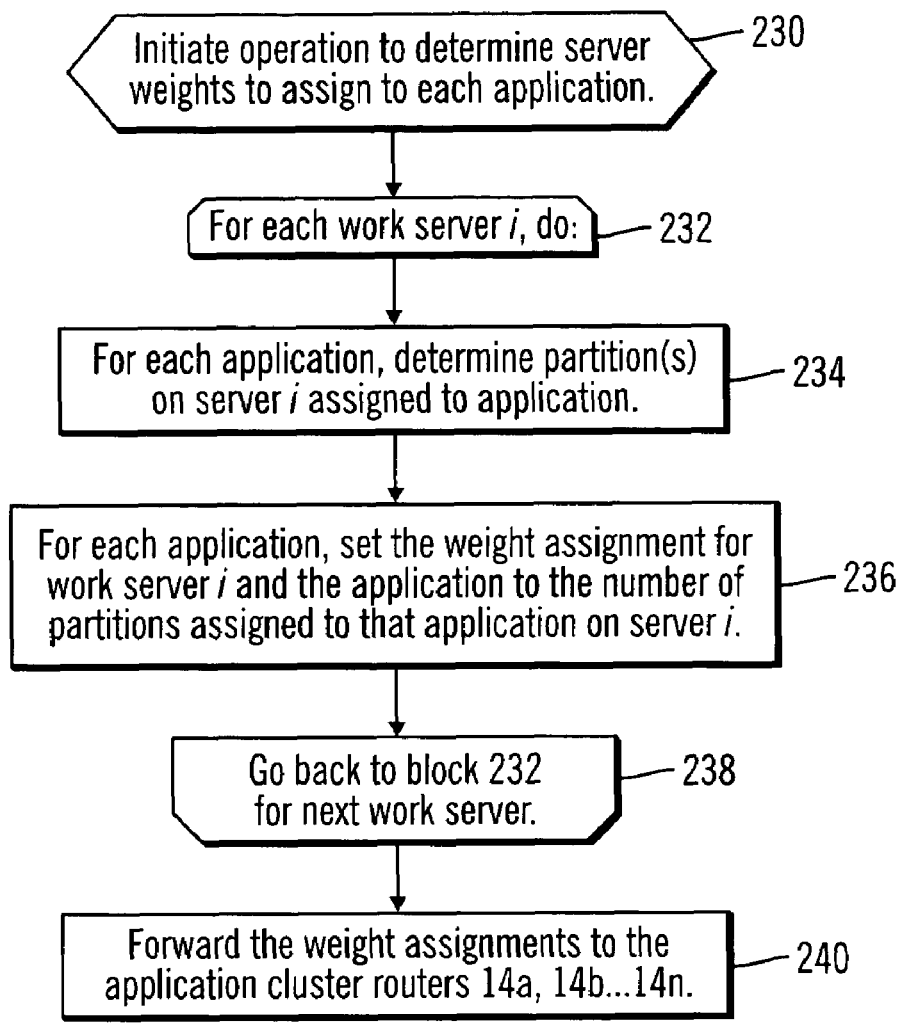

FIG. 9 illustrates operations performed by the workload manager 12 to determine the weights, e.g., 46 in FIG. 3, for each application, which are used when determining how to route application transactions among assigned work servers 10a, 10b . . . 10n. Upon initiating (at block 230) operations to determine server weights to assign to each application, the workload manager 12 performs a loop of operations at blocks 232 through 238 for each work server i. For each application, the workload manager 12 determines (at block 234) the one or more partitions on work server i assigned to the application and sets (at block 236) the weight assignment 40 (FIG. 3) for work server i (field 44) and the application (field 42), to the number of partitions (field 46) assigned to that application on work server i. Thus, in certain embodiments, the weight comprises the number of partitions in a work server assigned to one application. The workload manager 12 then forwards (at block 240) the determined weight assignments to the application cluster routers 14a, 14b . . . 14n that handle transactions for the application to which the weight is assigned. The application cluster router 14a, 14b . . . 14n assigned to handle transactions for a particular application uses the weight assignments for the work servers assigned to process transactions.

Figure 10:
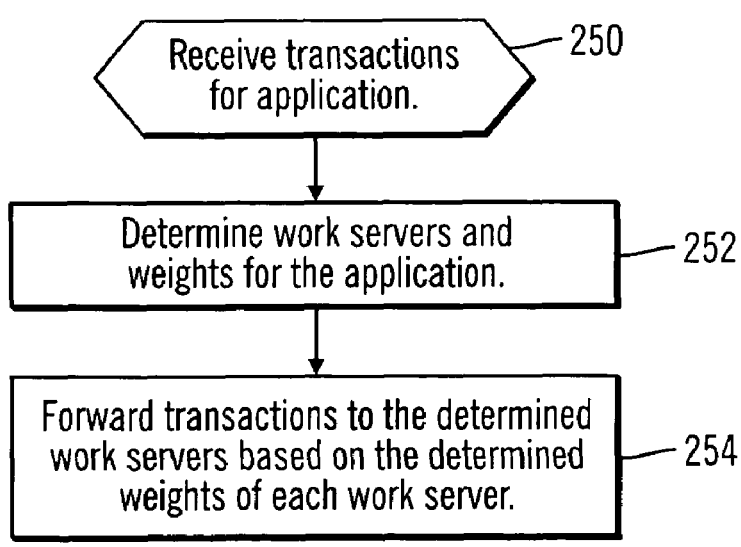

FIG. 10 illustrates operations performed by the application cluster routers 14a, 14b . . . 14n to forward transactions to the work servers 10a, 10b . . . 10n. Upon receiving (at block 250) transactions for one application 8a, 8b . . . 8n, the application cluster router 14a, 14b . . . 14n determines the work servers and weights for the application and then forwards the received transactions to the determined work servers 10a, 10b . . . 10n based on the weights for the work servers to which the transactions are sent. For instance, the application cluster router 14a, 14b . . . 14n may use the weights to determine a ratio of transactions sent to each work server 10a, 10b . . . 10n and then forward the transaction based on the ratio determined from the weights.

Figure 11:
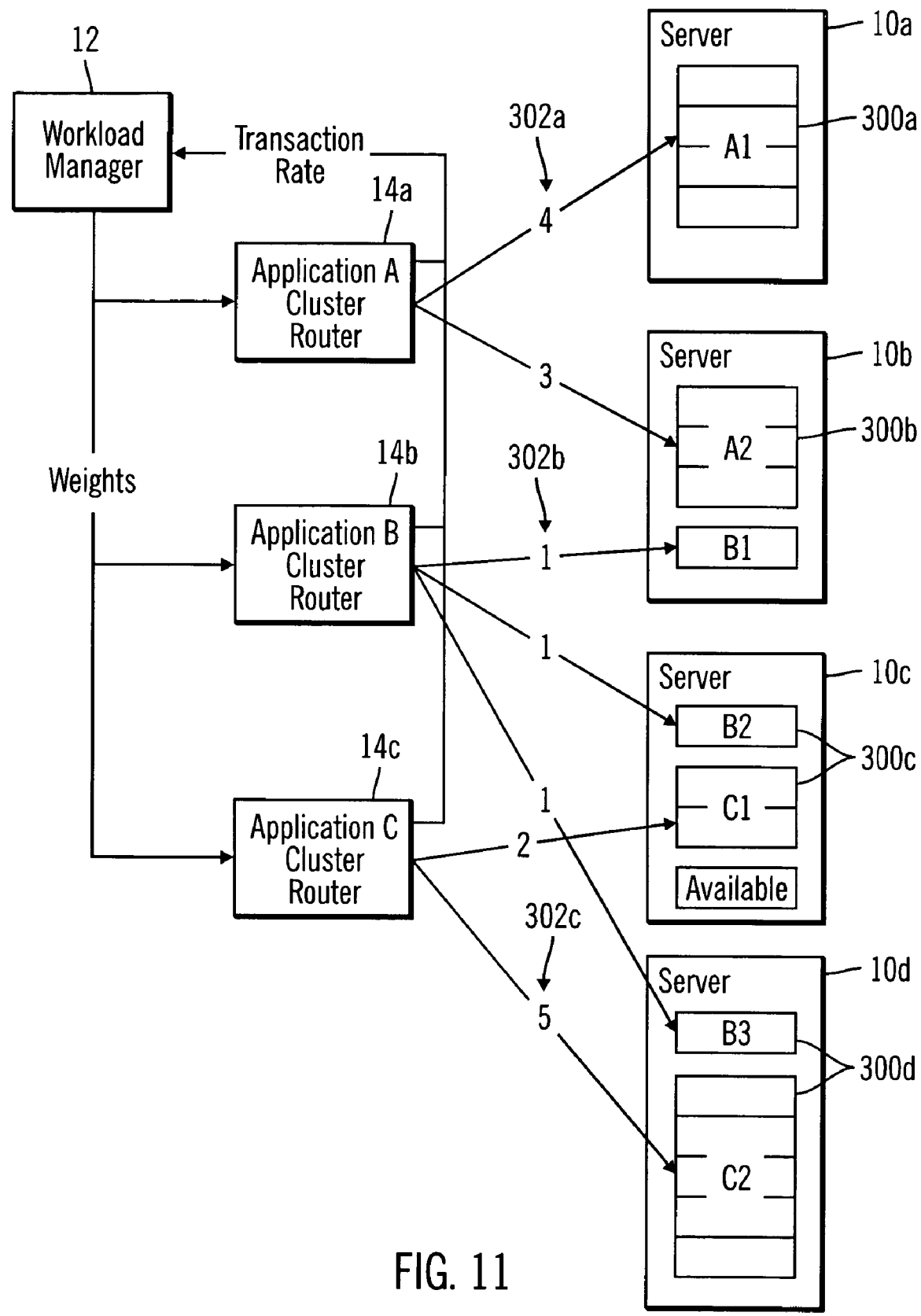
FIG. 11 illustrates an example of how application transactions are distributed among work servers.

FIG. 11 illustrates how the weights may be used to assign transactions for three applications, A, B, and C. FIG. 11 shows three application cluster routers 14a, 14b . . . 14c, one designated to handle the transactions for each application A, B, and C, respectively. The application cluster routers 14a, 14b, 14c route transactions to one or more of the servers 10a, 10b, 10c, 10d according to the weights 302a, 302b, 302c, which the workload manager 12 transmits to the application cluster routers 14a, 14b, 14c. Each server 10a, 10b, 10c, 10d includes a set of partitions 300a, 300b, 300c, 300d. For instance, servers 10a, 10b, and 10c each have four partitions and server 10d has six partitions, which is fifty percent more capacity. The application cluster routers 14a, 14b, 14c use the weights 302a, 302b, 302c to determine the ratio of application transactions to send to each work server 10a, 10b, 10c, 10d having partitions assigned to that application. For instance, application cluster router 14a uses weights of 4 and 3, which indicate the weights for work servers 10a and 10b. The application cluster 14a sends three transactions to work server 10b for every four transactions sent to work server 10a. Likewise, application cluster router 14b has three weights for three servers, which provides an even distribution of transactions from application B between the three work servers 10b, 10c, 10d. Similarly, application cluster router 14c has two weights 302c, which provides a ratio of 2 to 5, so that for every two transactions sent to work server 10c, five are sent to 10d. The application cluster routers 14a, 14b . . . 14n may use different techniques to transfer transactions to the assigned work servers according to the ratio specified by the weights, for instance, a group of transactions can be sent to each work server according to the ratio defined by the weights or the application cluster router 14a, 14b . . . 14n can alternate sending single transactions to the work servers according to the ratio defined by the weights.

With the described embodiments a weighting of transactions to send to work servers is determined by taking into account the processing capabilities of each work server for the particular application. A weighting is then determined for each application and work servers are assigned to process application transactions based on the number of partitions in the work server assigned to the application. The weighting is then used to determine how to allocate application transactions among the work servers assigned to process the application transactions.

Additional Embodiment Details

The described operations may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The described operations may be performed by circuitry, where "circuitry" refers to either hardware or software or a combination thereof. The circuitry for performing the operations of the described embodiments may comprise a hardware device, such as an integrated circuit chip, Programmable Gate Array (PGA), Application Specific Integrated Circuit (ASIC), etc. The circuitry may also comprise a processor component, such as an integrated circuit, and code in a computer readable medium, such as memory, wherein the code is executed by the processor to perform the operations of the described embodiments.

In certain embodiments, operations were described as performed by components, such as the workload manager 12 and application cluster router 14a, 14b . . . 14. In alternative embodiments, the described operations may be performed by components other than the described components or other shown components. For instance, the workload manager may just monitor the application cluster router 14a, 14b . . . 14n transactions and a separate global controller component may calculate the weights to use and assignment of partitions to applications.

The workload manager system 4 may comprise a single computational device or the operations of the workload manager 12 may be distributed across multiple systems.

The variable n is used to define any integer value indicating an instance of an element, e.g., number of clients 2a, 2b . . . 2n, number of applications 8a, 8b . . . 8n, etc. The variable n may indicate different integer values when used with different elements, such that there may be a different number of clients and work servers, etc.

The illustrated operations of FIGS. 6-10 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:

determining application transaction rates for a plurality of applications supplying transactions to be processed;

for each application, assigning available partitions in at least one server of a plurality of servers to process the application transactions based on partition transaction rates of partitions in the plurality of servers, wherein assigning the available partitions in the at least one server of the plurality of servers to process the application transactions comprises assigning available partitions in different servers of the plurality of servers to the application before assigning all available partitions in one server to the application, wherein a partition is a portion of processing resources in each server of the plurality of servers, wherein the partition is dynamically assigned to process one or more of the application transactions, and wherein a server transaction capability information is used to determine a transaction rate at which a server partition processes a selected application, wherein the transaction rate is a base weight divided by a number of partitions that is used for processing application transactions;

for each application, determining weights for each server including partitions assigned to the application based on a number of partitions in the server assigned to the application; and using the determined weights for each application to distribute application transactions among the servers including the partitions assigned to the application.

2. The method of claim 1, wherein the plurality of applications are capable of having different application transaction rates and those partitions that are in different servers are capable of having different partition transaction rates for one application.

3. The method of claim 1, wherein assigning the available partitions in the at least one server to process the application transactions comprises:

selecting all available partitions in one server to assign to the application before assigning partitions in another server.

4. The method of claim 1, wherein assigning the available partitions in the at least one server to process the application transactions further comprises:

selecting available partitions in one of the at least one server to assign the available partitions to the application until a total of the partition transaction rates of the assigned partitions is greater than or equal to the application transaction rate.

5. The method of claim 1, wherein the weight for each server comprises the number of partitions in the server assigned to the application, wherein using the determined weights for each application to distribute transactions for the application to the servers assigned to the application comprises:

determining an application ratio comprising a ratio of the weights to one another indicating how many transactions of the application are sent to the servers.

6. The method of claim 1, further comprising:

periodically determining current application transaction rates for the applications after determining the weights for each server;

for each application, assigning additional available partitions in the at least one server to process the application transactions in response to determining that the current application transaction rate for the application has increased by a threshold.

7. The method of claim 6, wherein the threshold comprises a first threshold, further comprising:
for each application, removing the assignment of at least one of the available partitions in the at least one server to process the application transactions in response to determining that the current application transaction rate for the application has decreased by a second threshold.

8. The method of claim 1, further comprising:
receiving a new application;
determining application transaction rates for the new application; and
assigning selected partitions to the new application, based on at least the determined application transaction rates for the new application.

9. The method of claim 1, further comprising:
determining partitions assigned to the at least one application to reassign to one application having an application transaction rate that is greater than a total of the partition transaction rates assigned to the application;
removing the assignment of the determined partitions from the at least one application to which they are assigned; and
reassigning the determined partitions to the application.

10. The method of claim 1, wherein:
(i) the partition is a logical division of the processing resources; and
(ii) once a selected partition is assigned to a selected application, the selected application is cloned for the selected partition to execute application transactions of the selected application in the selected partition.

11. A system in communications with applications and work servers, wherein the system includes circuitry enabled to perform:
determining application transaction rates for a plurality of applications supplying transactions to be processed;
for each application, assigning available partitions in at least one server of a plurality of servers to process the application transactions based on partition transaction rates of partitions in the plurality of servers, wherein assigning the available partitions in the at least one server of the plurality of servers to process the application transactions comprises assigning available partitions in different servers of the plurality of servers to the application before assigning all available partitions in one server to the application, wherein a partition is a portion of processing resources in each server of the plurality of servers, wherein the partition is dynamically assigned to process one or more of the application transactions, and wherein a server transaction capability information is used to determine a transaction rate at which a server partition processes a selected application, wherein the transaction rate is a base weight divided by a number of partitions that is used for processing application transactions;
for each application, determining weights for each server including partitions assigned to the application based on a number of partitions in the server assigned to the application; and
using the determined weights for each application to distribute application transactions among the servers including the partitions assigned to the application.

12. The system of claim 11, wherein the plurality of applications are capable of having different application transaction rates and those partitions that are in different servers are capable of having different partition transaction rates for one application.

13. The system of claim 11, wherein assigning the available partitions in the at least one server to process the application transactions comprises:
selecting all available partitions in one server to assign to the application before assigning partitions in another server.

14. The system of claim 11, wherein assigning the available partitions in the at least one server to process the application transactions further comprises:
selecting available partitions in one of the at least one server to assign the available partitions to the application until a total of the partition transaction rates of the assigned partitions is greater than or equal to the application transaction rate.

15. The system of claim 11, wherein the weight for each server comprises the number of partitions in the server assigned to the application, wherein using the determined weights for each application to distribute transactions for the application to the servers assigned to the application comprises:
determining an application ratio comprising a ratio of the weights to one another indicating how many transactions of the application are sent to the servers.

16. The system of claim 11, wherein the circuitry is further enabled to:
periodically determining current application transaction rates for the applications after determining the weights for each server;
for each application, assigning additional available partitions in the at least one server to process the application transactions in response to determining that the current application transaction rate for the application has increased by a threshold.

17. The system of claim 16, wherein the threshold comprises a first threshold, further comprising:
for each application, removing the assignment of at least one of the available partitions in the at least one server to process the application transactions in response to determining that the current application transaction rate for the application has decreased by a second threshold.

18. The system of claim 11, wherein the circuitry is further enabled to:
receiving a new application;
determining application transaction rates for the new application; and
assigning selected partitions to the new application, based on at least the determined application transaction rates for the new application.

19. The system of claim 11, wherein the circuitry is further enabled to:
determining partitions assigned to the at least one application to reassign to one application having an application transaction rate that is greater than a total of the partition transaction rates assigned to the application;
removing the assignment of the determined partitions from the at least one application to which they are assigned; and
reassigning the determined partitions to the application.

20. The system of claim 11, wherein:
(i) the partition is a logical division of the processing resources; and
(ii) once a selected partition is assigned to a selected application, the selected application is cloned for the selected partition to execute application transactions of the selected application in the selected partition.

21. A computer readable storage medium, wherein code stored in the computer readable storage medium when executed by a processor causes operations, the operations comprising:
determining application transaction rates for a plurality of applications supplying transactions to be processed;
for each application, assigning available partitions in at least one server of a plurality of servers to process the application transactions based on partition transaction rates of partitions in the plurality of servers, wherein assigning the available partitions in the at least one server of the plurality of servers to process the application transactions comprises assigning available partitions in different servers of the plurality of servers to the application before assigning all available partitions in one server to the application, wherein a partition is a portion of processing resources in each server of the plurality of servers, wherein the partition is dynamically assigned to process one or more of the application transactions, and wherein a server transaction capability information is used to determine a transaction rate at which a server partition processes a selected application, wherein the transaction rate is a base weight divided by a number of partitions that is used for processing application transactions;
for each application, determining weights for each server including partitions assigned to the application based on a number of partitions in the server assigned to the application; and
using the determined weights for each application to distribute application transactions among the servers including the partitions assigned to the application.

22. The computer storage readable medium of claim 21, wherein the plurality of
applications are capable of having different application transaction rates and those partitions that are in different servers are capable of having different partition transaction rates for one application.

23. The computer storage readable medium of claim 21, wherein assigning the available partitions in the at least one server to process the application transactions comprises:
selecting all available partitions in one server to assign to the application before assigning partitions in another server.

24. The computer storage readable medium of claim 21, wherein assigning the available partitions in the at least one server to process the application transactions further comprises:
selecting available partitions in one of the at least one server to assign the available partitions to the application until a total of the partition transaction rates of the assigned partitions is greater than or equal to the application transaction rate.

25. The computer storage readable medium of claim 21, wherein the weight for each server comprises the number of partitions in the server assigned to the application, wherein using the determined weights for each application to distribute transactions for the application to the servers assigned to the application comprises: determining an application ratio comprising a ratio of the weights to one another indicating how many transactions of the application are sent to the servers.

26. The computer storage readable medium of claim 21, the operations further comprising:
periodically determining current application transaction rates for the applications after determining the weights for each server;
for each application, assigning additional available partitions in the at least one server to process the application transactions in response to determining that the current application transaction rate for the application has increased by a threshold.

27. The computer storage readable medium of claim 26, wherein the threshold comprises a first threshold, the operations further comprising:
for each application, removing the assignment of at least one of the available partitions in the at least one server to process the application transactions in response to determining that the current application transaction rate for the application has decreased by a second threshold.

28. The computer storage readable medium of claim 21, the operations further comprising:
receiving a new application;
determining application transaction rates for the new application; and
assigning selected partitions to the new application, based on at least the determined application transaction rates for the new application.

29. The computer storage readable medium of claim 21, the operations further comprising:
determining partitions assigned to the at least one application to reassign to one application having an application transaction rate that is greater than a total of the partition transaction rates assigned to the application;
removing the assignment of the determined partitions from the at least one application to which they are assigned; and
reassigning the determined partitions to the application.

30. The computer readable storage medium of claim 21, wherein:
(i) the partition is a logical division of the processing resources; and
(ii) once a selected partition is assigned to a selected application, the selected application is cloned for the selected partition to execute application transactions of the selected application in the selected partition.

31. The method of claim 10, wherein the transaction rate at which the server partition processes the selected application is a partition transaction rate, the method, the method further comprising:
for each application, maintaining an application threshold information, wherein the application threshold information includes:
(i) an upper threshold that indicates a transaction level for the application at which one or more partitions are to be added; and
(ii) a lower threshold that indicates the transaction level for the application at which one or more partitions are to be removed.

32. The system of claim 20, wherein the transaction rate at which the server partition processes the selected application is a partition transaction rate, wherein the system is further enabled to perform:
for each application, maintaining an application threshold information, wherein the application threshold information includes:

(i) an upper threshold that indicates a transaction level for the application at which one or more partitions are to be added; and (ii) a lower threshold that indicates the transaction level for the application at which one or more partitions are to be removed.

33. The computer readable storage medium of claim 30, wherein the transaction rate at which the server partition processes the selected application is a partition transaction rate, the operations further comprising:

for each application, maintaining an application threshold information, wherein the application threshold information includes:

(i) an upper threshold that indicates a transaction level for the application at which one or more partitions are to be added; and (ii) a lower threshold that indicates the transaction level for the application at which one or more partitions are to be removed.

* * * * *

UNITED STATES PATENT AND TRADEMARK OFFICE
CERTIFICATE OF CORRECTION

PATENT NO. : 7,660,897 B2  Page 1 of 1
APPLICATION NO. : 10/911058
DATED : February 9, 2010
INVENTOR(S) : Hall, Jr. et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1351 days.

Signed and Sealed this

Thirtieth Day of November, 2010

David J. Kappos
*Director of the United States Patent and Trademark Office*